No. 775,189. PATENTED NOV. 15, 1904.
N. C. MILLER.
HOISTING, DUMPING, AND TRAMMING APPARATUS.
APPLICATION FILED APR. 4, 1903.
NO MODEL. 6 SHEETS—SHEET 1.

Nicholas C. Miller, Inventor

Witnesses
Jas. L. McCathran
W. J. Riley

By C. G. Siggers
Attorney

No. 775,189. PATENTED NOV. 15, 1904.
N. C. MILLER.
HOISTING, DUMPING, AND TRAMMING APPARATUS.
APPLICATION FILED APR. 4, 1903.
NO MODEL. 6 SHEETS—SHEET 5.

Nicholas C. Miller, Inventor

No. 775,189. Patented November 15, 1904.

UNITED STATES PATENT OFFICE.

NICHOLAS C. MILLER, OF MINERALPOINT, WISCONSIN.

HOISTING, DUMPING, AND TRAMMING APPARATUS.

SPECIFICATION forming part of Letters Patent No. 775,189, dated November 15, 1904.

Application filed April 4, 1903. Serial No. 151,155. (No model.)

*To all whom it may concern:*

Be it known that I, NICHOLAS C. MILLER, a citizen of the United States, residing at Mineralpoint, in the county of Iowa and State of Wisconsin, have invented a new and useful Hoisting, Dumping, and Tramming Apparatus, of which the following is a specification.

The invention relates to an apparatus for hoisting, dumping, and tramming material, such as ore, rock, coal, refuse, and the like.

The object of the present invention is to provide an apparatus designed especially for use in mines and adapted to hoist material in the shaft of a mine to the surface or other desired elevation and to automatically dump the same into a tram-car and to carry the material from the shaft of the mine and discharge the same from the tram-car at the desired point.

A further object of the invention is to provide an apparatus of this character capable of being actuated by the raising and lowering of a mining bucket or cage and adapted to carry the material the desired distance from the shaft of the mine and to be adjusted to vary the distance traversed by the tram-car.

Furthermore, it is the object of the present invention to provide an apparatus capable of tramming the material in four different directions and adapted to be operated by an engineer at a distance from the tram-cars to deliver coal, ore, or like material at one side of the shaft and carry the same in one direction and to deliver refuse material at the opposite side of the shaft and carry the same in the opposite direction, whereby the two materials will be discharged at different points and at places remote from each other.

Another object of the invention is to provide a hoisting, dumping, and tramming apparatus adapted to operate at mines where the shafts are either straight and vertical or crooked by reason of portions being disposed at an inclination and to enable the mining cage or bucket and the operating mechanism carried thereby to yield and conform to the particular arrangement of the guides or ways of a shaft having inclined portions.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without deparing from the spirit or sacrificing any of the advantages of the invention.

In the drawings, Fig. 17 is a detail view of the ratchet device for holding the operating-lever of the tram-car-actuating mechanism in its adjusted position.

Similar reference-numerals indicate corresponding parts in all the figures of the drawings.

Figures 3, 11:
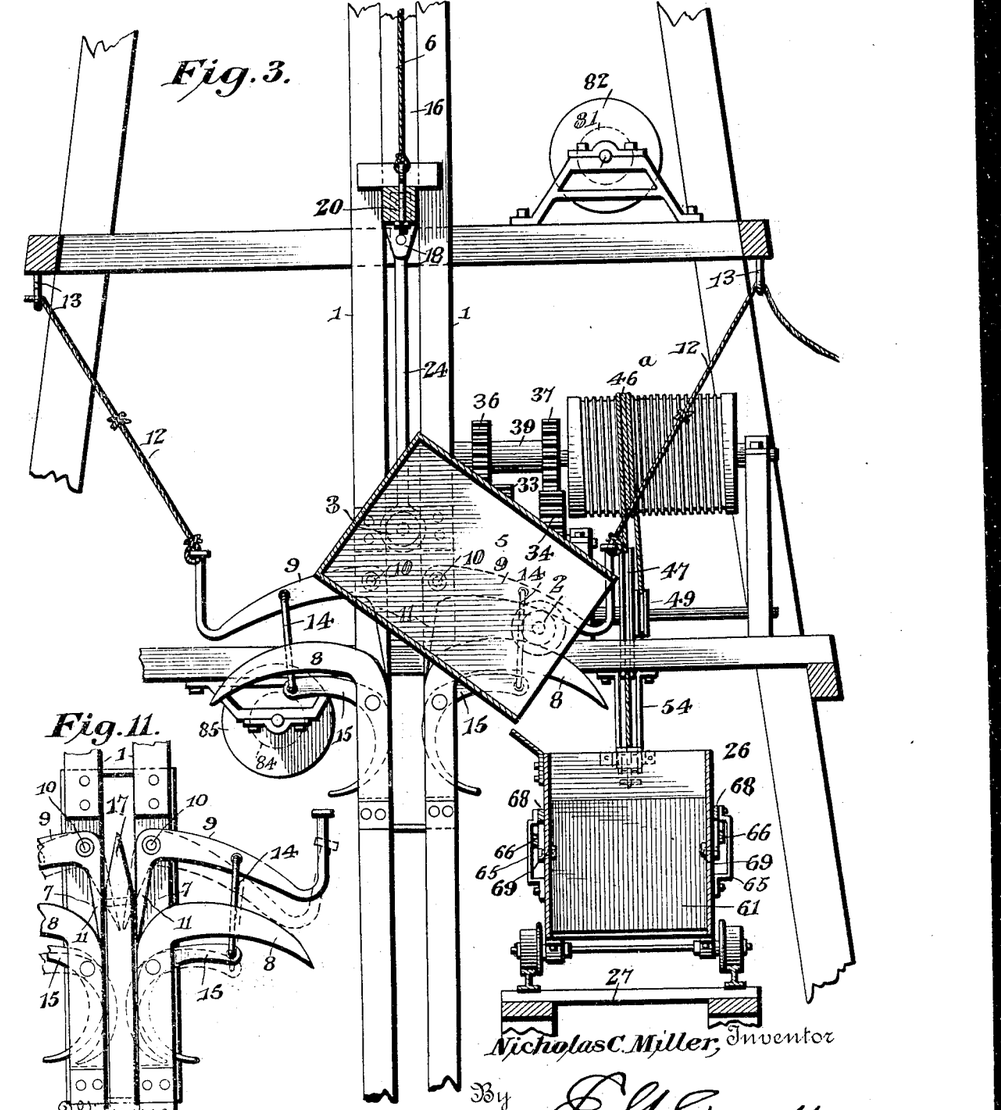
Fig. 3 is an enlarged vertical sectional view of a portion of the apparatus, showing the mining bucket or cage in position for discharging its contents into one of the tram-cars.

1 1 designate similar upright ways designed to be located at opposite sides of the shaft of a mine and to extend to the surface of the ground or to a suitable distance above the same and adapted to receive and guide upper and lower rollers or wheels 2 and 3 of a mining cage or bucket 5, connected by a means hereinafter described to a hoisting rope or cable 6, and the latter is operated in the ordinary manner by a suitable engine. (Not shown.) The upper pulleys or wheels 2, which are shorter than the lower ones, are adapted when the mining bucket or cage is raised to move laterally through side openings 7 of the guides or ways 1. The openings 7 are located at opposite sides of the said guides or ways, which are provided at the bottoms of the openings with lateral extensions 8, having curved upper faces or treads to receive the said upper rollers or wheels. When the mining bucket or cage arrives at about the limit of its upward movement, the upper rollers or wheels are directed through one set of the lateral openings by the means hereinafter described, and the lower rollers or wheels are caused to move upward in the guides or ways 1 to a point above the lateral openings to invert the bucket to the position illustrated in Fig. 3 of the drawings.

Figures 2, 11, 16:
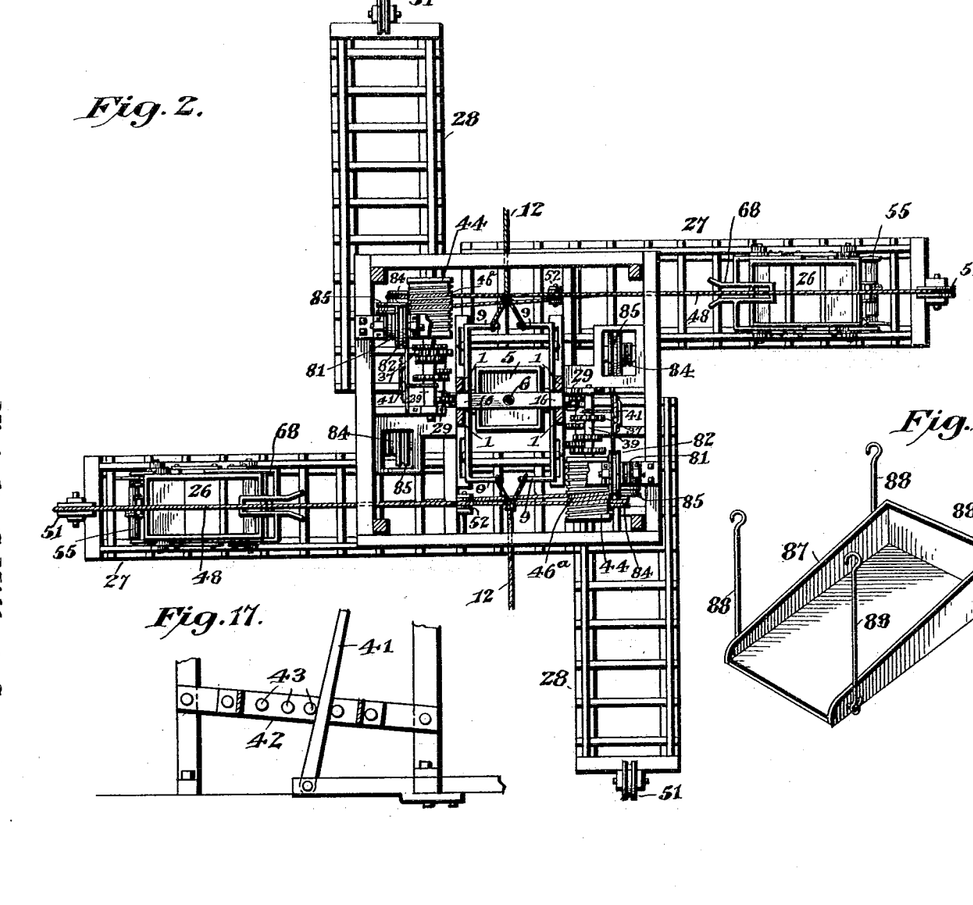
Fig. 2 is a plan view partly in section.
Fig. 11 is an elevation of the same.
Fig. 16 is a detail view of the detachable chute.

A pair of approximately L-shaped switches 9 is arranged at each of the guides or ways 1, as clearly shown in Fig. 11 of the drawings, and each switch is pivotally mounted at its angle at 10, a bushing being preferably employed to prevent the switch from binding on the pivot. The inner arm 11 of the switch is shorter than the outer one and is adapted to be arranged to close the lateral openings 7 to the upper rollers, as illustrated in full lines in Fig. 11 of the drawings, and to expose the lateral openings and guide the upper rollers or wheels into the same when arranged as shown in dotted lines in Fig. 11 of the drawings. The outer arms of the switches 9 are extended and connected to operating-ropes 12, having branches and passing through suitable guides 13, located above the pivotal switches. The operating cords or ropes extend to points within easy reach of the engineer in order that either set of switches may be locked in the position illustrated in full lines in Fig. 11. The other set will then be free to operate if the operating cord or rope be slackened. The outer arm of the switch is heavier than the inner arm and will automatically swing the inner arm across the space between the bars of the guide or way 1 to catch the upper roller or wheel and cause the same to move laterally through the openings or spaces 7. When the upper roller or wheel moves outward through the opening or space 7 on the lateral extension or arm 8 of the guide or way, it will engage the outer arm of the switch and swing the same upward, thereby carrying the inner arm to the upright position (illustrated in Fig. 3 of the drawings) to permit the lower roller or wheel to pass it and to prevent the said inner arm from interfering with the continued upward movement of the lower roller or wheel.

The outer arms of the pivotal switches are also connected by links 14 with the upper arms of operating-levers 15, fulcrumed between their ends at opposite sides of the upright guides or ways at points below the lateral openings 7 and provided with approximately horizontal upper arms and with curved lower arms. The lower arms present curved convex faces at the spaces between the bars or members of the guides or ways 1 and project into such spaces when the inner arms of the pivotal switches extend into the said spaces. The curved arms of the operating-levers 15 are adapted to be engaged by side bars 16 of a reciprocating frame, which carries the bucket or cage and which is connected to the hoisting rope or cable. The upper and lower ends 17 and 18 of the side bars 16 are tapered, as shown, to enable the reciprocating frame to engage and actuate the curved arms of the levers 15 in ascending and to engage the inner arms of the pivotal switches in descending. By this construction the reciprocating frame or carrier is adapted to pass the switches and the levers at the lateral openings 7.

The reciprocating frame, which is connected with the hoisting rope or cable, may consist of a rigid structure when the guides or ways 1 are vertical; but a flexible or yielding structure may be employed, as hereinafter explained, when the shaft of a mine is crooked and contains portions arranged at an inclination. The reciprocating frame is composed of the said bars 16, transverse connecting-bars 19 and 20, and upper and lower oppositely-inclined braces 21 and 22, suitably secured to the side bars 16 and the upper and lower transverse bars. The hoisting rope or cable preferably extends through an aperture of the upper horizontal connecting-bar 19 and is secured to the lower horizontal connecting-bar by an eyebolt 23, as clearly shown in Fig. 4; but any other means may be employed for connecting the hoisting rope or cable to the reciprocating frame or carrier.

The reciprocating frame or carrier is provided at its bottom with a pair of depending hanger bars or rods 24, having angularly-bent lower ends 25, which are pivotally connected to the cage or bucket at the lower rollers or wheels, preferably by means of the axles or spindles of the latter. The upper rollers or wheels of the cage or bucket slide freely in the upright ways or guides 1 and are adapted to move freely through the lateral openings 7, as before explained. The pivotal connections between the depending hanger-rods and the cage or bucket form the sole means for connecting the cage or bucket with the reciprocating carrier, whereby the cage or bucket is adapted to swing laterally for dumping.

Figures 8, 9, 10:
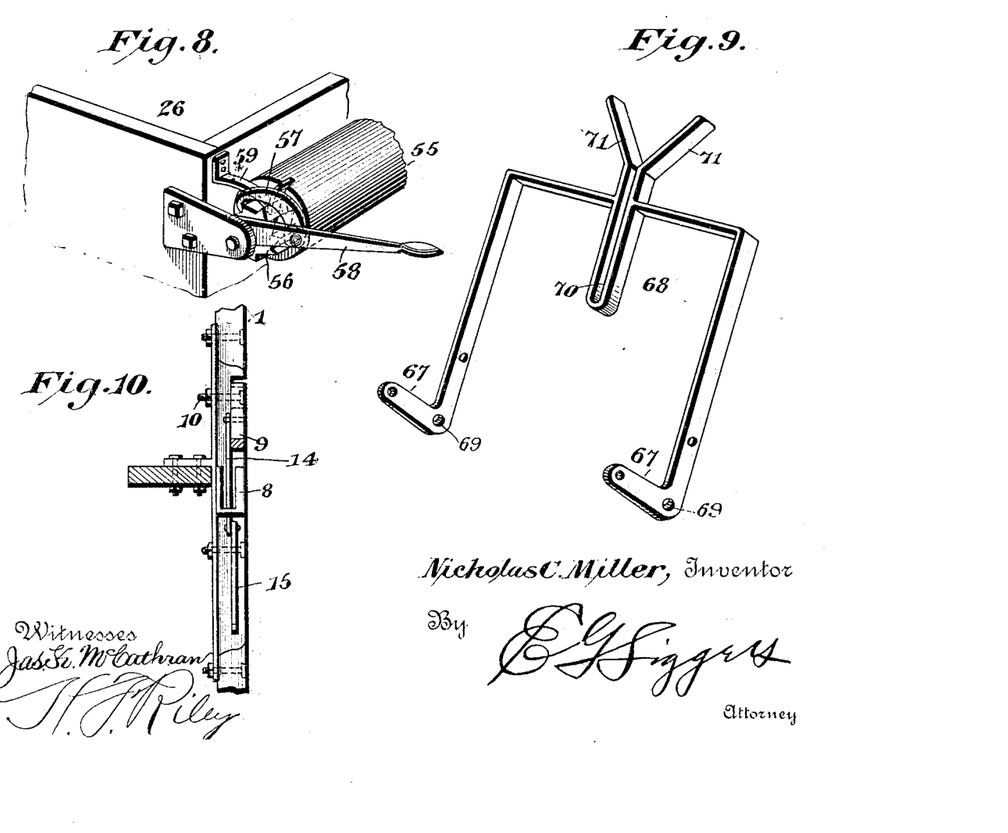
Fig. 8 is a detail view of the tension device for taking up the slack of the tram cables or ropes.
Fig. 9 is a detail perspective view of the oscillatory operating frame or lever for opening and closing the dumping-gates of the tram-car.
Fig. 10 is a detail view illustrating the manner of mounting the pivotal switches for effecting a dumping of the mining bucket or cage.

The guides or ways 1 are provided at the lateral openings 7 with metal plates or castings, and the arms or extensions 8, which are preferably formed integral with the plates or castings, are provided with slots to receive the links 14, as clearly indicated in Fig. 10 of the drawings.

The cage or bucket, which may be dumped at either side of the shaft of the mine, is adapted to discharge its contents into either of a pair of tram-cars 26, located at opposite sides of the mine-shaft and adapted, as hereinafter explained, to be actuated by the upward and downward movement of the bucket or cage, the downward movement of the same being utilized for moving the tram-cars away from the shaft and the upward movement being employed for returning the car, whereby the latter will always be in position to receive the contents of the bucket or cage.

Main and supplemental tracks 27 and 28 are provided for each of the tram-cars. The main tracks, which are arranged parallel with each other, extend from the mine-shaft in opposite directions, and the supplemental tracks, which also extend in opposite directions from the shaft of the mine, are disposed at right angles to the main tracks 27, as clearly illustrated in Fig. 2 of the drawings. By this construction the apparatus is adapted to tram in four different directions, and as the tram-cars on the downward movement of the cage or bucket will travel in opposite directions away from the shaft of the mine it will be apparent that ore and refuse material may be trammed in opposite directions and discharged at points remote from each other.

The vertically-reciprocating frame which carries the hoisting bucket or cage is provided at opposite sides with racks 30, which mesh with gearing for actuating the tram-cars, tram-car-operating mechanism being located at opposite sides of the shaft of the mine, as clearly shown in Fig. 2 of the drawings. These mechanisms are of the same construction, and a detailed description of the parts of one of them will be sufficient to enable the apparatus to be thoroughly understood.

The rack-bar or rack 30 may be of any desired length to secure the necessary movement of the tram-car, and it meshes with a gear-wheel 29 of a shaft 31. The shaft 31 is journaled in suitable bearings, and it has keyed or otherwise secured to it gear-wheels 32, 33, and 34, which are adapted to be brought into mesh with gear-wheels 35, 36, and 37 of a counter-shaft 38. These gears are of different diameters, and those of the shaft 38 are mounted on a sliding sleeve 39, which is connected by a yoke 40 with a shifting lever 41, adapted to be oscillated to bring a gear of the shaft 38 into mesh with a corresponding gear of the shaft 31, and by this adjustment the distance traveled by the tram-car may be varied to dump the material at the desired point. The adjustment of the gearing should be made while the cage or bucket is elevated and the tram-cars are at the shaft. The downward movement of the racks will then carry the cars away from the shaft and the upward movement will return them to the same, and the adjustment will not interfere with the proper returning of the cars to the shaft. The gears in practice will preferably be constructed in sections in order to enable them to be readily detached from the shafts to permit other gears of different diameters to be substituted for them to secure the desired movement of the tram-car. By varying the gearing and the length of the rack of the reciprocating frame the tram-car may be moved any desired distance. The sleeve 39 is provided with an annular groove to receive the yoke 40, and the operating-lever, which is fulcrumed at its lower end, is provided with a perforation to receive a shank or projection of the yoke and is suitably secured to the same. The lever is retained in its adjusted position by a ratchet device 42, consisting of a bar having an oblong loop or keeper provided at one side with a series of projections 43, arranged in the path of the lever 41 and spaced apart to receive the same. When it is desired to adjust the gearing, the operating-lever is drawn outward slightly to disengage it from the adjacent projections, and it is then swung on its pivot to bring the proper gears into mesh.

The shaft 38 carries a drum 44, one end of which is hollow to receive the adjacent gear-wheel 37 to permit the sleeve 39 to move inward on the shaft 38. The drum 44 is provided with a spiral groove 45 to receive a tram rope or cable 46$^a$, which is wound around the drum a sufficient number of times to provide the necessary frictional engagement between it and the drum to prevent it from slipping when the tram-car is heavily laden. One flight or run 46 extends downward under a large pulley 47 to one end of the tram-car, and the other run, 48, extends under a small pulley 49 of the shaft on which the pulley 47 is mounted. The run 48 of the rope or cable then passes through an upright adjustable guide 50 and then extends over the tram-car to an end guide-pulley 51. The guide-pulley 51 is mounted in a suitable support, and the run 48 extends backward from the pulley 51 and is adjustably secured to the outer end of the tram-car. The guide 50, which is vertically movable, is provided with upper and lower guide-pulleys 52, and it is secured to a bracket 53, having a plurality of perforations for the reception of the fastening devices for attaching the guide. The bracket 53 is mounted on a portion of the supporting frame or framework of the apparatus, and a guide-pulley 54 may be provided for the run 46 of the rope or cable, as any suitable guiding means may be employed to arrange the runs or flights in proper position with relation to the tram-car and the actuating mechanism.

The outer end of the tram rope or cable is secured to a roller or shaft 55 and is adapted to be wound thereon to take up any slack. The roller or shaft is provided at one end with ratchet-teeth 56, arranged to be engaged by a pawl 57 of a lever 58, whereby the drum or shaft is rotated to tighten the tram rope or cable. The lever 58 is loosely fulcrumed on the shaft of the roller or drum, and the latter is held against backward movement by means of a resilient pawl 59; but a spring-actuated pawl of the ordinary construction may be provided for this purpose.

The tram-car is provided at its top with end rollers or pulleys 60, arranged to receive and support the adjacent portion of the run 48 of the tram rope or cable and to prevent the same from catching on the car and interfering with the free movement of the same. These pulleys or rollers 60 also prevent the tram rope or cable from being worn by rubbing against the edges of the car.

Figure 7:
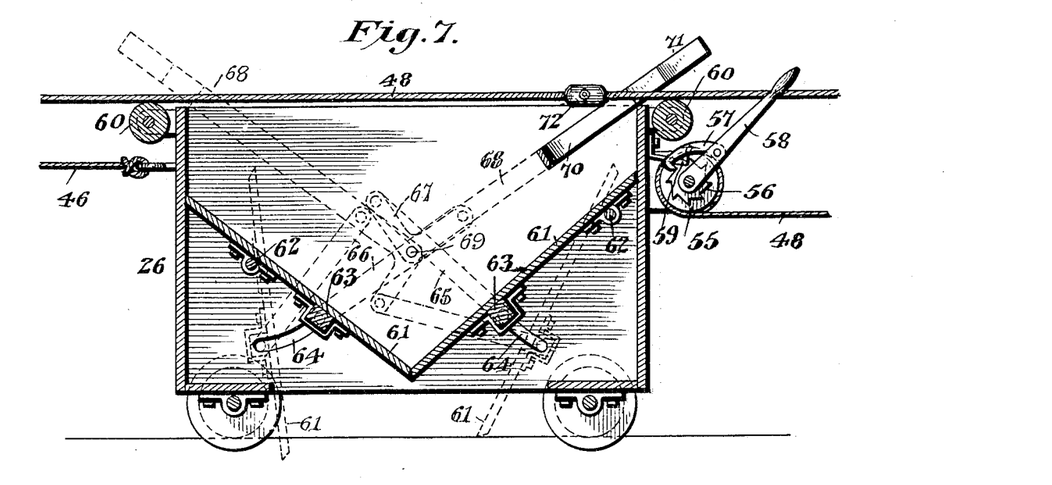
Fig. 7 is an enlarged sectional view of one of the tram-cars, the dumping-gates being shown closed in full lines and open in dotted lines.

The tram-car is provided with a pair of pivotally-mounted dumping-gates 61, hinged or pivoted near their upper ends by transverse shafts or pintles 62 and adapted to swing inward and outward toward and from each other, whereby they are adapted to be arranged as shown in full and dotted lines in Fig. 7 of the drawings. The dumping-gates 61 are provided near their lower ends with transverse bars 63, having reduced ends projecting laterally from the dumping-gates through curved slots 64 of the sides of the tram-car. The projecting ends of the transverse bar 63 form pivots and extend through perforations of the outer ends of a pair of links 65 and 66, which are connected at their inner ends with bell-crank lever portions 67 of an oscillatory lever-frame 68. The oscillatory lever 68, which is approximately U-shaped, is composed of parallel side portions and a connecting top portion. The lower ends of the side portions are extended at right angles to form the bell-crank lever portions 67, which are fulcrumed at the angles at 69. The links 65 and 66 are connected with the bell-crank lever portions 67 at opposite sides of the pivot or fulcrum, as clearly shown in Fig. 1 of the drawings. When the oscillatory lever-frame 68 is swung in one direction, the links and the dumping-gates are moved outward, and when the frame 68 is swung in the opposite direction the dumping-gates are moved inward. When the dumping-gates are closed, the links and the lever-frame form a lock for holding the gates in such position.

Figures 1, 18, 19:
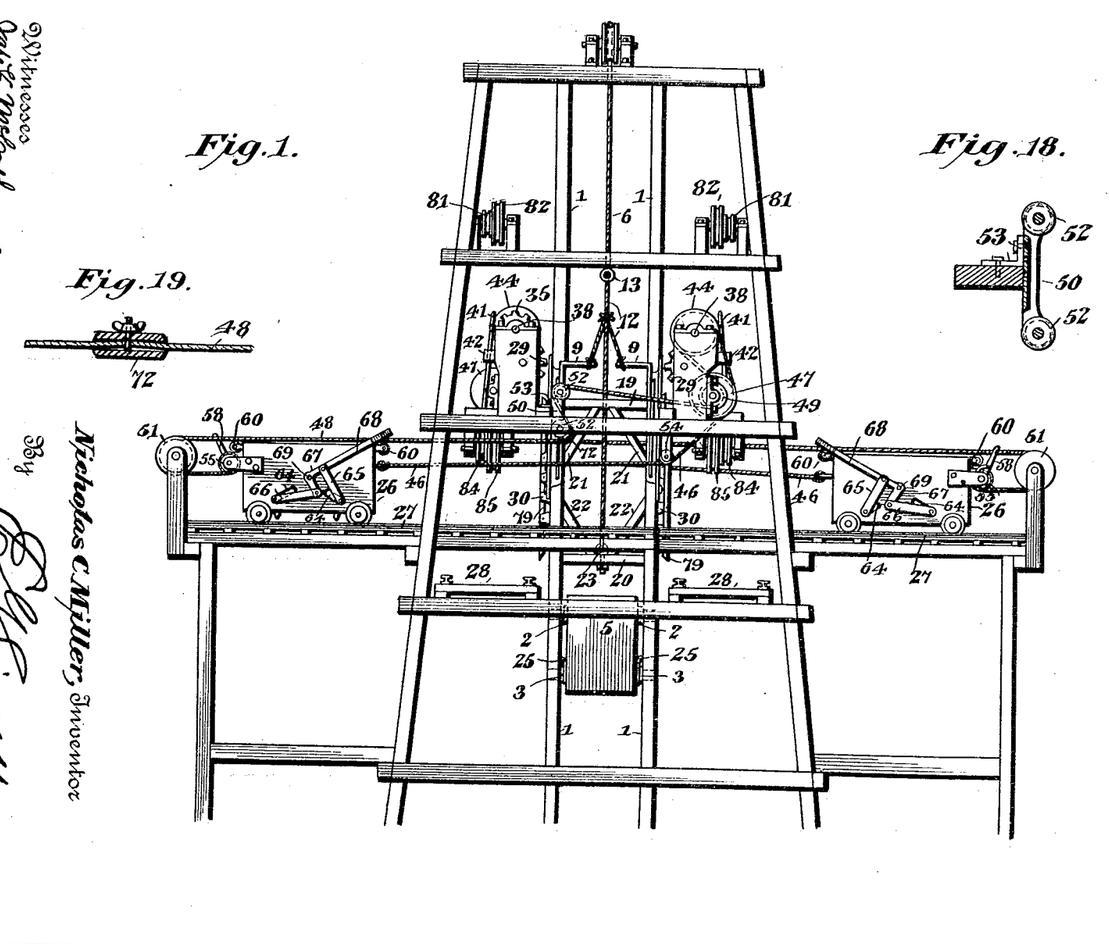
Figure 1 is an elevation of an apparatus for hoisting, dumping, and tramming constructed in accordance with this invention.
Fig. 18 is a detail view of the vertically-adjustable guide.
Fig. 19 is a detail view of the adjustable button, illustrating the manner of securing the same to the cable.

The oscillatory lever-frame 68 is provided at its top with an open oblong guide 70, having diverging upper portions 71, adapted to catch readily the upper run or flight 48 of the tram rope or cable. The guide 70 receives the flight or run 48 of the tram rope or cable, which is provided with an adjustable button or projection 72, adapted to engage the oscillatory frame or lever 68 to swing the same from one side or end of the car to the other to open the dumping-gates for discharging the contents of the car and to close the gates to arrange the car to receive the contents of the bucket or cage. When the tram-car is arranged at the outer portion of the track, as indicated in Fig. 1 of the drawings, the button or projection of the tram rope or cable is located at a point between the tram-car and the drum of the shaft 38, whereby when the tram-car moves inward toward the shaft of the mine the button or projection will be carried outward into engagement with the oscillatory frame or lever 68 and will swing the same to the outer end of the car, thereby closing the dumping-gates. The button or projection of the tram rope or cable passes over the guide of the oscillatory frame or lever 68, and when the tram-car has received the contents of the bucket or cage and is again moved outward the oscillatory frame or lever 68 will be engaged by the button or projection of the tram-cable and will be swung to the inner end of the car, as indicated in Fig. 1 of the drawings. When the inner ends of the links 65 and 66 are carried over and beyond the fulcrum-points of the sides of the oscillatory frame or lever, the weight of the contents of the tram-car upon the dumping-gates will operate to complete the dumping movement of the same.

Figures 4, 5, 6, 12:
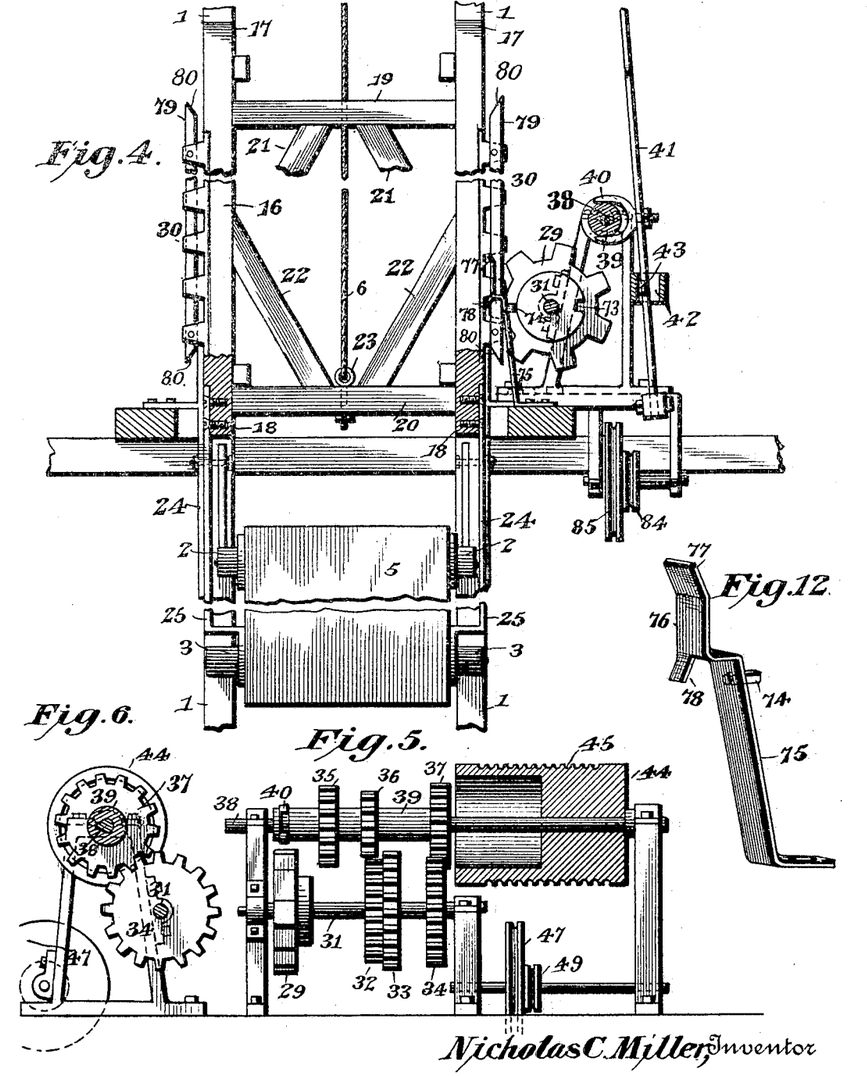
Fig. 4 is a vertical sectional view taken at right angles to Fig. 3.
Fig. 5 is an enlarged sectional view of the mechanism for transmitting motion to the tram cable or rope.
Fig. 6 is a transverse sectional view of the same.
Fig. 12 is a detail perspective view of the device for locking the tram-cable-operating mechanism against movement when the actuating-rack of the mining cage or bucket is carried beyond the said mechanism.

The reciprocating frame or carrier, which is provided with the rack for actuating the tram-car, is located above the bucket or cage, and the movement of the tram-car in approaching the shaft of the mine is completed before the bucket or cage is dumped, and the rack will have left the gearing before the said bucket or cage is tilted. In order to prevent any accidental movement of the tram-car and the mechanism for actuating the same, the gear-wheel 29, which meshes with the rack, is provided with a notch or recess 73, which is adapted to be engaged by a lug or projection 74 of a resilient locking device 75, adapted to engage and lock the gear-wheel automatically when the rack leaves the same. The locking device 75, which is constructed of suitable resilient material, is secured at its lower end to a suitable support, and it is provided at its upper end with an arm 76, offset from the plane of the body portion of the locking device and having oppositely-inclined upper and lower faces 77 and 78, adapted to be engaged by a bar 79. The bar 79 is carried by the rack 30 and extends beyond the ends of the same, being provided with beveled projecting ends 80, adapted to engage the arm 76 of the catch 75, whereby the lug or projection 74 thereof will be withdrawn from engagement with the notch of the ratchet-wheel before the rack begins to mesh with the teeth of the said ratchet-wheel 29. The bar 79 holds the catch out of engagement with the gear-wheel, as indicated in Fig. 4 of the drawings, when the rack is in mesh with the gear-wheel, and as soon as the bar 79 leaves the catch or locking device 75 the same will automatically engage the notch of the gear-wheel. A plurality of notches may be provided for this purpose, and the momentum of the tram-car will move the gear-wheel sufficiently to carry the notch into engagement with the lug or projection of the catch 75 after the rack has left the gear-wheel.

Figures 13, 15:
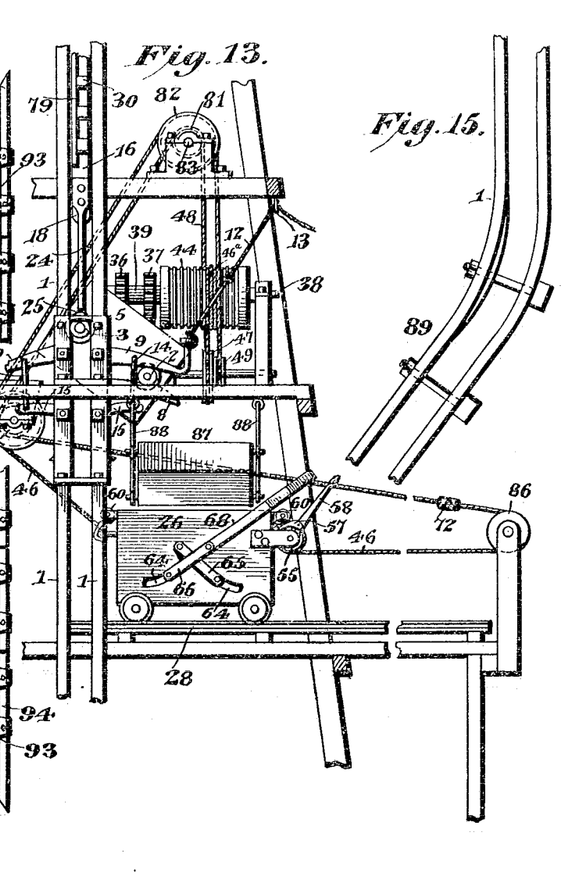
Fig. 13 is an elevation, partly in section, of a portion of the apparatus, the tram rope or cable being arranged for moving the tram-car on the supplemental track.
Fig. 15 is a detail view of a guide or way having an inclined portion.

When the tram-car is arranged on the supplemental track 28, the tram rope or cable is arranged as illustrated in Fig. 13 of the drawings. The flights or runs extend upward from the pulleys 47 and 49 to pulleys 81 and 82 of a shaft 83, which is mounted in suitable bearings at a point above the drum 44. The tram-cable then extends down to a pair of pulleys 84 and 85, located adjacent to the inner end of the track. One flight or run of the cable is connected directly to the inner end of the tram-car, and the other flight or run extends from the pulleys 84 and 85 to an outer guide-pulley 86, located at the outer end of the supplemental track. This flight or run of the tram rope or cable is extended backward from the pulley 86 to the outer end of the tram-car and is adjustably connected to the same by the means heretofore described.

The tram-car is operated as before described; but the material from the bucket or cage is first discharged into an inclined chute 87, provided with hangers or rods 88, terminating at their upper ends in hooks for engaging suitable eyes or supports and adapted to be readily detached therefrom to permit the chute to be removed when not in use.

Figure 14:
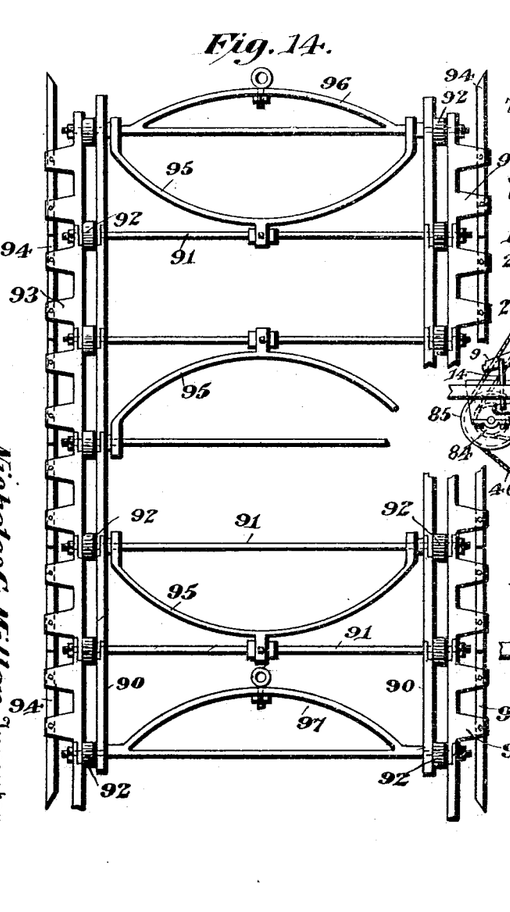
Fig. 14 is a detail view of the flexible tram-car-actuating device.

When the shaft of the mine is crooked and the guides have inclined portions 89, as indicated in Fig. 15 of the drawings, a flexible reciprocating frame or carrier is employed and is adapted to yield to and conform to the configuration of the guides or ways. The side bar 90, as shown in Fig. 14 of the drawings, is composed of sections pivoted together by transverse rods 91, which form shafts or spindles for antifriction rollers or wheels 92, and the latter are interposed between the sections 90 and the racks 93, which are composed of sections. These antifriction rollers or wheels 92 are adapted to reduce the friction of the flexible frame at the joints thereof and to enable the frame to slide easier in the guides or ways. The ends of the transverse rods 91 are threaded to receive nuts; but any other suitable fastening devices may be employed, as will be readily understood. The bars 94 for holding the catches or locking devices 75 out of engagement with the gear-wheels 29 are also composed of sections, and the flexible reciprocating frame or carrier is provided at intervals with curved braces 95 to prevent the parts from sagging or collapsing. The braces 95 are provided at their ends with perforations to receive the adjacent transverse rods, and they have perforated lugs or ears at their centers to receive rods 91. Suitable bars or braces 96 and 97 are arranged at the top and bottom of the flexible carrier or frame to receive the hoisting rope or cable.

Any suitable means may be employed for adjustably mounting the button or projection on the rope or cable for enabling the same to be changed to dump at different points. The point of dumping may be varied or changed by adjusting the button by varying the length of the rack and by adjusting the gears for communicating motion from the lower horizontal shaft to the upper horizontal shaft, on which the drum is mounted.

Having thus fully described my invention, what I claim as new, and desire to secure by Letters Patent, is—

1. In an apparatus of the class described, the combination of a hoisting-bucket, a tram-car movable to and from the bucket, and means movable with the bucket for positively actuating the tram-car in each direction, substantially as described.

2. In an apparatus of the class described, the combination with a hoisting-bucket, of means movable to and from the bucket for conveying the contents thereof from the same, and means movable with the bucket for positively actuating the said means in each direction, substantially as described.

3. In an apparatus of the class described, the combination with hoisting mechanism, of carrying means movable to and from the hoisting mechanism, and means carried by the hoisting mechanism for positively actuating in each direction the carrying mechanism, during a portion of the movement of the hoisting mechanism, substantially as described.

4. In an apparatus of the class described, the combination of a hoisting-bucket, a tram-car movable to and from the hoisting-bucket, means movable upward and downward with the bucket for positively actuating the tram-car in each direction, and means for dumping the contents of the hoisting-bucket into the tram-car, substantially as described.

5. In an apparatus of the class described, the combination of a hoisting-bucket, means for automatically dumping the same, carrying mechanism for conveying the contents of the bucket away from the same, and means movable upward and downward with the bucket for positively actuating the carrying mechanism in its movement toward and from the bucket, substantially as described.

6. In an apparatus of the class described, the combination of hoisting mechanism provided with means for automatically dumping its contents, carrying means movable to and from the hoisting mechanism and operable by the upward and downward movement of the latter, and means for automatically dumping the contents of the carrying mechanism, substantially as described.

7. In an apparatus of the class described, the combination of a hoisting-bucket, means for automatically dumping the same, an automatically-operated tram-car movable to and from the hoisting-bucket to receive the contents thereof and to convey the same away from the bucket, and means for automatically dumping the tram-car, substantially as described.

8. In an apparatus of the class described, the combination of a hoisting-bucket, a tram-car movable to and from the bucket, and mechanism connected with the tram-car and with the bucket, whereby the former will be positively operated automatically when the latter moves upward and downward, substantially as described.

9. In an apparatus of the class described, the combination of a hoisting-bucket, a tram-car, and mechanism connected with a tram-car for actuating the same, said mechanism being provided with an actuating member movable with the hoisting-bucket, substantially as described.

10. In an apparatus of the class described, the combination of a hoisting-bucket, a tram-car having dumping-gates, mechanism connected with the tram-car for actuating the same, said mechanism being provided with an actuating member movable with the bucket, and means carried by the said mechanism for operating the dumping-gates of the tram-car, substantially as described.

11. In an apparatus of the class described, the combination of a hoisting-bucket, a tram-car having dumping-gates, means movable upward and downward with the bucket for automatically actuating the tram-car, and adjustable means carried by the said means for operating the dumping-gates, whereby the tram-car may be caused to dump at the desired point, substantially as described.

12. In an apparatus of the class described, the combination of hoisting mechanism provided with a rack, and carrying mechanism for conveying the contents of the hoisting mechanism having a gear arranged in the path of and adapted to mesh with the rack, whereby the carrying mechanism will be automatically operated by the upward and downward movement of the hoisting mechanism, substantially as described.

13. In an apparatus of the class described, the combination of hoisting mechanism provided with a rack, and tram-car-actuating mechanism having a gear arranged to be engaged by the rack, substantially as described.

14. In an apparatus of the class described, the combination with a guide or way having a lateral opening and provided with an extension, of a hoisting-bucket having upper and lower rollers of different lengths, a pivoted switch arranged at the lateral opening, and means for operating the switch, substantially as described.

15. In an apparatus of the class described, the combination with a guide or way having lateral openings, of pivotal switches arranged at opposite sides of the guide or way at the said openings, a hoisting-bucket having upper and lower rollers of different lengths, and means for operating the switches, substantially as described.

16. In an apparatus of the class described, the combination of a guide or way having a lateral opening, a hoisting-bucket having upper and lower rollers or wheels, a pivoted switch, means for operating the switch by hand, and means for operating the same automatically to permit the hoisting mechanism of the bucket to pass the switch, substantially as described.

17. In an apparatus of the class described, the combination of a guide or way having a lateral opening, a switch pivotally mounted at the opening, and operating mechanism connected with the switch and arranged to be engaged by the hoisting mechanism of a bucket, whereby the switch will be automatically operated, substantially as described.

18. In an apparatus of the class described, the combination of a guide or way having a lateral opening, a switch pivotally mounted at the opening, and a lever connected with the switch and having an arm arranged to project into the guide or way when the switch is open and adapted to be engaged by the hoisting mechanism of a bucket, substantially as described.

19. In an apparatus of the class described, the combination of a guide or way having lateral openings, pivotal switches located at opposite sides of the guide or way, means connected with the switches for operating the same by hand, levers pivotally mounted between their ends and connected with the switches and having arms arranged to project into the guide or way when the switches are open, and a hoisting-bucket having hoisting mechanism provided with means for engaging the levers for operating the switches automatically, substantially as described.

20. In an apparatus of the class described, the combination of a guide or way, a pivotal switch, a lever connected with the switch and arranged to project into the guide or way when the switch is open, and a hoisting-bucket having hoisting mechanism provided with a tapered projection arranged to engage the levers to operate the switches automatically, substantially as described.

21. In an apparatus of the class described, the combination of hoisting mechanism provided with a rack, tram-car-actuating mechanism having a gear arranged in the path of and adapted to mesh with the rack, a locking device for holding the said mechanism stationary when the rack is out of mesh with the gear, and means carried by the hoisting mechanism for automatically releasing the gear, substantially as described.

22. In an apparatus of the class described, the combination of hoisting mechanism provided with a rack, tram-car-operating mechanism having a gear arranged in the path of and adapted to mesh with the rack, a movable locking device for holding the gear when the rack is out of engagement with the same, and a bar carried by the hoisting mechanism and arranged to engage the locking device to release the gear and extending the entire length of the rack to hold the locking device out of engagement while the rack is rotating the said gear, substantially as described.

23. In an apparatus of the class described, the combination of hoisting mechanism provided with a rack, tram-car-actuating mechanism having a gear arranged in the path of and adapted to mesh with the rack, a resilient locking device provided with means for engaging the gear and having oppositely-inclined upper and lower faces, and a bar carried by the hoisting mechanism and extending the entire length of the rack and having projecting ends arranged to engage the inclined faces of the locking device, substantially as described.

24. In an apparatus of the class described, the combination of hoisting mechanism provided with a rack, a gear arranged in the path of the rack and adapted to mesh with the same, a drum, a series of shiftable gears for connecting the said gear and the drum, and a tram-car-actuating cable or rope arranged on the drum, substantially as described.

25. In an apparatus of the class described, the combination of hoisting mechanism provided with a rack, shafts, a gear mounted on one of the shafts and arranged in the path of the rack, a drum carried by the other shaft, gears mounted on the shafts and adapted to mesh with each other, and means for operating the gears for changing the speed of the drum, substantially as described.

26. In an apparatus of the class described, the combination of hoisting mechanism having a rack, upper and lower horizontal shafts, a gear mounted on the lower horizontal shaft and arranged in the path of the rack, a series of gears fixed to one of the shafts, a slidable sleeve mounted on the other shaft and provided with a series of gears adapted to mesh with the said gears, a shifting lever connected with the sleeve, means for locking the lever in its adjustment, and a drum carried by the upper shaft, substantially as described.

27. In an apparatus of the class described, the combination of a reciprocatory tram-car, a rope or cable connected with the same, a drum receiving the rope or cable, hoisting mechanism, and means for communicating motion from the hoisting mechanism to the drum, substantially as described.

28. In an apparatus of the class described, the combination of a reciprocating tram-car, a rope or cable connected with the same, guide-pulleys for the rope or cable, a drum receiving the rope or cable, gearing connected with the drum, and hoisting mechanism provided with means for actuating the gearing, substantially as described.

29. In an apparatus of the class described, the combination of a reciprocating tram-car having dumping mechanism, a cable or rope connected with the tram-car, a drum receiving the rope or cable, means for actuating the drum, and means carried by the cable for operating the dumping mechanism of the tram-car, substantially as described.

30. In an apparatus of the class described, the combination with hoisting mechanism, of a drum operated by the same, a reciprocating tram-car, a rope or cable connected with the tram-car and with the drum, and means operable by the rope or cable for dumping the car, substantially as described.

31. In an apparatus of the class described, the combination with hoisting mechanism, of a drum operated by the same, a tram-car having dumping mechanism, and a rope or cable connected with the tram-car and with the drum and provided with means for operating the dumping mechanism, substantially as described.

32. In an apparatus of the class described, the combination with hoisting mechanism, of a drum operated by the same, a tram-car having dumping mechanism provided with an oscillatory operating device, and means carried by the rope or cable for engaging the oscillatory operating device, substantially as described.

33. In an apparatus of the class described, the combination with a hoisting mechanism, of a drum operated by the same, a tram-car having dumping mechanism provided with an oscillatory operating device, a rope or cable for connecting the tram-car with the drum, and a button mounted on the rope or cable and arranged to engage the oscillatory operating device, substantially as described.

34. In an apparatus of the class described, the combination of a drum, a reciprocating tram-car having dumping mechanism provided with an oscillatory operating device, a rope or cable connected with the car and with the drum, and means mounted on the rope or cable for engaging the oscillatory operating device, substantially as described.

35. In an apparatus of the class described, the combination of a drum, a reciprocating tram-car having dumping mechanism provided with an oscillatory operating device, a rope or cable connected with the car and with the drum, and an adjustable button mounted on the cable and arranged to engage the oscillatory operating device, substantially as described.

36. In an apparatus of the class described, the combination of a drum, a reciprocating tram-car having dumping mechanism provided with an oscillatory operating device, said operating device having an open guide, a rope or cable connected with the car and arranged on the drum and passing through the guide, and a button mounted on the rope or cable and arranged to engage the oscillatory operating device, substantially as described.

37. In an apparatus of the class described, the combination of a drum, a reciprocating tram-car provided with dumping mechanism having an oscillatory operating device extending across the top of the car and provided with an open guide, a rope or cable connected with the car and arranged on the drum and passing through the guide, and means carried by the rope or cable for engaging the oscillatory operating device, substantially as described.

38. In an apparatus of the class described, the combination of a drum, a reciprocating tram-car having dumping mechanism provided with an oscillatory operating-lever, said operating-lever being provided at the top of the car with an open guide having divergent side portions, a rope or cable arranged on the drum and connected with the car and passing through the guide, and means carried by the rope or cable for engaging the oscillatory operating device, substantially as described.

39. In an apparatus of the class described, the combination of a drum, a tram-car having dumping-gates, an oscillatory operating-lever fulcrumed on the tram-car, links connected with the dumping-gates and with the lever, a rope or cable connected with the car and arranged on the drum, and means carried by the rope or cable for engaging the oscillatory operating device, substantially as described.

40. In an apparatus of the class described, the combination of a tram-car having dumping-gates, an oscillatory lever having bell-crank portions fulcrumed on the car, links connecting the dumping-gates with the bell-crank portions of the lever, a cable, and means carried by the cable for operating the oscillatory lever, substantially as described.

41. In an apparatus of the class described, the combination of a tram-car having dumping mechanism provided with an oscillatory operating device, a cable connected with the car and having a run or flight movable reversely of the car and provided with means for engaging the oscillatory operating device, substantially as described.

42. In an apparatus of the class described, the combination of a tram-car having dumping mechanism and provided with an oscillatory operating device, a cable connected with the car and having a run or flight movable reversely of the said car and provided with means for engaging the oscillatory operating device, and antifriction devices carried by the car and arranged to receive the rope or cable, substantially as described.

43. In an apparatus of the class described, the combination of a reciprocating tram-car having dumping mechanism, a drum, a rope or cable arranged on the drum and connected with the car, an adjustable guide receiving the rope or cable, and means carried by the rope or cable for operating the dumping mechanism, substantially as described.

44. In an apparatus of the class described, the combination of a reciprocating tram-car having dumping mechanism provided with an oscillatory operating device, a rope or cable having a run or flight movable reversely of the car and provided with means for engaging the operating device, an adjustable guide receiving the said run or flight, and means for operating the cable, substantially as described.

45. In an apparatus of the class described, the combination with hoisting mechanism, of main and supplemental tracks extending from the hoisting mechanism and arranged at an angle to each other, a tram-car adapted to be arranged on either of the tracks, a drum operated by the upward and downward movement of the hoisting mechanism, a rope or cable arranged on the drum and connected with the tram-car, and guide-pulleys located at the main and supplemental tracks to receive the rope or cable, substantially as described.

46. In an apparatus of the class described, the combination of a hoisting-bucket arranged to dump in opposite directions, tracks located at opposite sides of the hoisting-bucket and extending in opposite directions, tram-cars, means for automatically operating the tram-cars when the bucket moves upward and downward, and means for dumping the bucket at either side, substantially as described.

47. In an apparatus of the class described, the combination of a hoisting-bucket, main and supplemental tracks arranged at an angle, a tram-car adapted to be arranged on either track, a drum, means movable upward and downward with the bucket for operating the drum, a rope or cable arranged on the drum and connected with the car, guide-pulleys arranged at the tracks to receive the rope or cable, and a removable chute adapted to receive the contents of the bucket and arranged to discharge the said contents into the tram-car when the latter is on the supplemental track, substantially as described.

48. In an apparatus of the class described, the combination of a guide or way having an inclined portion, a hoisting-bucket, and a reciprocating frame or carrier provided with pivotally-connected sections and adapted to yield and conform to the configuration of the guide or way, substantially as described.

49. In an apparatus of the class described, the combination with a hoisting-bucket, of a frame or carrier connected with the bucket and composed of pivotally-connected sections and provided at the joints with antifriction devices, substantially as described.

50. In an apparatus of the class described, the combination with a hoisting-bucket, of a flexible frame or carrier composed of pivotally-connected sections and provided with antifriction devices, a rack carried by the frame or carrier and composed of pivoted sections, and carrying mechanism having a gear arranged in the path of the rack and operated by the same, substantially as described.

51. In an apparatus of the class described, the combination of a flexible frame or carrier composed of pivoted sections and having antifriction devices and provided with transverse braces, a rack mounted on the frame or carrier and composed of pivoted sections, a gear arranged in the path of the rack, a locking device for engaging the gear, and a bar mounted on the frame or carrier and composed of sections and arranged to disengage the locking device, substantially as described.

52. In an apparatus of the class described, the combination of a tram-car having dumping mechanism provided with a shiftable operating device, a rope or cable connected with the tram-car and having a flight or run movable reversely of the car and provided with means for actuating the shiftable operating device, and means for actuating the cable, substantially as described.

53. In an apparatus of the class described, the combination with hoisting mechanism, of a tram-car having dumping mechanism provided with a shiftable operating device, and a cable connected with the tram-car and having a run movable reversely of the same and provided with means for actuating the shiftable operating device, said cable being operated by the hoisting mechanism, substantially as described.

54. In an apparatus of the class described, the combination of a hoisting-bucket, a tram-car movable to and from the hoisting-bucket, means movable with the bucket in its upward and downward movement and operable during a portion of the movement of the bucket for actuating the tram-car, and means for dumping the contents of the hoisting-bucket into the tram-car, substantially as described.

55. In an apparatus of the class described, the combination of a hoisting-bucket, means for automatically dumping the same, and automatically-operated carrying mechanism positively actuated in each direction for conveying the contents of a bucket away from the latter, substantially as described.

56. In an apparatus of the class described, the combination of a hoisting-bucket, means for automatically dumping the same, an automatically-operated tram-car movable to and from the bucket and positively actuated in each direction for conveying the contents of the bucket away from the same, and means for automatically dumping the tram-car, substantially as described.

57. In an apparatus of the class described, the combination of hoisting mechanism, automatically-operating carrying means movable with the hoisting mechanism during a portion of the movement thereof, and means for varying the distance traveled by the carrying mechanism, substantially as described.

58. In an apparatus of the class described, the combination of hoisting mechanism, automatically-operating carrying means movable with the hoisting mechanism during a portion of the movement thereof for conveying the contents of the hoisting mechanism from the same, means for varying the distance traveled by the carrying mechanism, and means for discharging the contents of the carrying mechanism at the limit of the outward movement of the same, substantially as described.

59. In an apparatus of the class described, the combination of a hoisting-bucket, means for automatically dumping the same, a tram-car, movable simultaneously with the bucket to and from the same for conveying the contents of the bucket, means for automatically starting and stopping the tram-car, whereby the same is operated during a portion of the movement of the bucket, and means for automatically dumping the tram-car, substantially as described.

60. In an apparatus of the class described, the combination of hoisting mechanism, a tram-car movable to and from the hoisting mechanism, and mechanism connected with the tram-car and with the hoisting mechanism for automatically starting and stopping the tram-car whereby the latter is operated during a portion of the movement of the hoisting mechanism, substantially as described.

61. In an apparatus of the class described, the combination of hoisting mechanism, a tram-car movable to and from the hoisting mechanism, mechanism connected with the tram-car and with the hoisting mechanism for automatically actuating and automatically starting and stopping the former whereby the same is operated during a portion of the movement of the latter, and means for automatically dumping the tram-car at the desired distance from the hoisting mechanism, substantially as described.

62. In an apparatus of the class described, the combination of hoisting mechanism, a tram-car having dumping-gates, mechanism connected with the tram-car and with the hoisting mechanism for automatically actuating and starting and stopping the tram-car whereby the latter is operated during a portion of the movement of the hoisting mechanism, said mechanism for actuating the tram-car being provided with an actuating member carried by the hoisting mechanism, and means for automatically operating the dumping-gates to open and close the same, substantially as described.

63. In an apparatus of the class described, the combination of hoisting mechanism, a tram-car having dumping-gates, actuating mechanism connected with the tram-car and operated by the hoisting mechanism during a portion of the movement of the latter, and means carried by the actuating mechanism for automatically operating the dumping-gates to open and close the same, substantially as described.

64. In an apparatus of the class described, the combination of hoisting mechanism, a tram-car having dumping-gates, actuating mechanism operated by the upward and downward movement of the hoisting mechanism for operating the tram-car during a portion of the movement of the hoisting mechanism, and adjustable means carried by the actuating mechanism for operating the dumping-gates, whereby the tram-car may be caused to dump at the desired point, substantially as described.

65. In an apparatus of the class described, the combination of hoisting mechanism, carrying mechanism for conveying the contents of the hoisting mechanism provided with a gear, and a rack operable by the hoisting mechanism and arranged to mesh with the gear during a portion of the movement of the hoisting mechanism and adapted to automatically operate the carrying mechanism, substantially as described.

66. In an apparatus of the class described, the combination of hoisting mechanism, carrying mechanism for conveying the contents of the hoisting mechanism movable to and from the same, and gearing for operating the carrying mechanism, one of the elements of the gearing being automatically operated by the hoisting mechanism and arranged to actuate the carrying mechanism during a portion of the movement of the hoisting mechanism, substantially as described.

67. In an apparatus of the class described, the combination of hoisting mechanism, carrying mechanism for conveying the contents of the hoisting mechanism movable to and from the same, gearing for actuating the carrying mechanism, and means carried by the hoisting mechanism and meshing with the gearing and automatically actuating the same during a portion of the movement of the hoisting mechanism, substantially as described.

68. In an apparatus of the class described, the combination of a guide or way having oppositely-disposed lateral openings, switches located at the said openings, automatically-operating carrying mechanism movable to and from the bucket and located at opposite sides of the guide or way, a bucket having upper and lower rollers of different lengths, the shorter rollers being arranged to pass through the lateral openings for dumping the bucket, and means for operating the switches, whereby the bucket may be dumped into either carrying mechanism, substantially as described.

69. In an apparatus of the class described, the combination of hoisting mechanism, automatically-operating carrying mechanism located at opposite sides of the hoisting mechanism and movable in different directions, and means for dumping the hoisting mechanism into either of the carrying mechanisms, substantially as described.

70. In an apparatus of the class described, the combination of a hoisting-bucket, automatically-operating tram-cars located at opposite sides of the hoisting-bucket and actuated by the same during a portion of the upward and downward movement thereof, and means for automatically dumping the bucket into either of the tram-cars, substantially as described.

71. In an apparatus of the class described, the combination of hoisting mechanism, carrying mechanism located at opposite sides of the hoisting mechanism and automatically operated by the same and movable in different directions, and means for automatically dumping the hoisting mechanism into either carrying mechanism and for automatically discharging the contents thereof at the desired distance from the hoisting mechanism, substantially as described.

72. In an apparatus of the class described, the combination of hoisting mechanism, carrying mechanism located at opposite sides of the hoisting mechanism and movable in different directions, means for automatically discharging the hoisting mechanism into either carrying mechanism, and means for automatically operating the carrying mechanism during a portion of the movement of the hoisting mechanism and for dumping the contents of the carrying mechanism at the desired distance from the hoisting mechanism, substantially as described.

73. In an apparatus of the class described, the combination of a guide or way, a movable switch, a lever connected with the switch, hoisting mechanism having a bucket and provided with means for automatically actuating the lever to operate the switch, substantially as described.

74. In an apparatus of the class described, the combination of hoisting mechanism, carrying mechanism movable to and from the hoisting mechanism during a portion of the movement thereof, and means for positively locking the carrying mechanism against movement during the other portion of the movement of the carrying mechanism, substantially as described.

75. In an apparatus of the class described, the combination of hoisting mechanism, automatically-operating carrying mechanism movable to and from the hoisting mechanism and operated by the same during a portion of the movement thereof, means for automatically pumping the carrying mechanism at the limit of its outward movement, and means for positively locking the carrying mechanism against movement during the other portion of the movement of the hoisting mechanism, substantially as described.

76. In an apparatus of the class described, the combination of hoisting mechanism, a dumping tram-car movable to and from the hoisting mechanism and operated by the same during a portion of the movement thereof, means for automatically dumping the tram-car, and means for positively locking the tram-car against movement during the other portion of the movement of the hoisting mechanism, substantially as described.

77. In an apparatus of the class described, the combination of hoisting mechanism, carrying mechanism movable to and from the hoisting mechanism and having a gear, a rack carried by the hoisting mechanism and meshing with and actuating the gear during a portion of the movement of the hoisting mechanism, and means for locking the carrying mechanism against movement when the rack is out of mesh with the gear, substantially as described.

78. In an apparatus of the class described, the combination of hoisting mechanism, carrying mechanism movable to and from the hoisting mechanism, gearing operated by the hoisting mechanism for actuating the carrying mechanism and having separable elements arranged in operative relation during a portion of the movement of the hoisting mechanism, and means for locking the carrying mechanism against movement when the gearing is out of such operative relation, substantially as described.

79. In an apparatus of the class described, the combination of hoisting mechanism provided with a rack, carrying mechanism having a gear arranged in the path of and adapted to mesh with the rack, an automatically-operating locking device for holding the carrying mechanism when the rack is out of mesh with the gear, and means for automatically disengaging the locking device when the rack engages the gear, substantially as described.

80. In an apparatus of the class described, the combination of hoisting mechanism provided with a rack, carrying mechanism having a gear arranged in the path of the rack, an automatically-operating locking device for holding the carrying mechanism when the rack is out of mesh with the gear, and a releasing device carried by the hoisting mechanism for engaging the locking device, the latter being arranged in the path of the releasing device, substantially as described.

81. In an apparatus of the class described, the combination of hoisting mechanism provided with a rack, a gear arranged in the path of the rack, carrying mechanism operated by the gear, and means for changing the speed of the carrying mechanism, substantially as described.

82. In an apparatus of the class described, the combination of hoisting mechanism provided with a rack, a gear arranged in the path of the rack, a drum operated by the gear, carrying mechanism actuated by the drum, and means for changing the speed of the drum independently of the movement of the hoisting mechanism, substantially as described.

83. In an apparatus of the class described, the combination of hoisting mechanism provided with a rack, a gear arranged to be operated by the rack, a drum, a series of gears connected with the drum and arranged to be operated by the said gear, and means for shifting the gears to change the speed of the drum without affecting that of the hoisting mechanism, substantially as described.

84. In an apparatus of the class described, the combination of hoisting mechanism having a rack, upper and lower horizontal shafts, a gear mounted on the lower horizontal shaft and arranged in the path of the rack, a series of gears fixed to one of the shafts, slidable gears mounted on the other shaft, and means for shifting the slidable gears, substantially as described.

85. In an apparatus of the class described, the combination of hoisting mechanism having a rack, upper and lower horizontal shafts, a gear mounted on one of the shafts and arranged in the path of the rack, fixed and slidable gears carried by the said shafts, a shifting lever connected with the slidable gears, and a drum operated by the gears and having its speed varied by the shifting of the slidable gears, substantially as described.

86. In an apparatus of the class described, the combination with hoisting mechanism, of a tram-car, a rope or cable connected with the tram-car for reciprocating the same and operated by the hoisting mechanism, and means operable by the rope or cable for dumping the car, substantially as described.

87. In an apparatus of the class described, the combination of hoisting mechanism, a tram-car having dumping mechanism and provided with a movable operating device, a rope or cable connected with the tram-car and operated by the hoisting mechanism, and means carried by the rope or cable for actuating the operating device, substantially as described.

In testimony that I claim the foregoing as my own I have hereto affixed my signature in the presence of two witnesses.

NICHOLAS C. MILLER.

Witnesses:
    D. H. WILLIAMS,
    JOYCE WILLIAMS.